United States Patent
Podszun et al.

(10) Patent No.: US 6,549,628 B1
(45) Date of Patent: Apr. 15, 2003

(54) METHOD FOR DETERMINING AND OPTIONALLY ELIMINATING A DISTURBING NOISE SUBJECTIVELY PERCEIVED BY AN OPERATOR

(75) Inventors: Werner Podszun, Belchenstrasse 47, 72622 Nuertingen (DE); Klaus Genuit, Herzogenrath (DE)

(73) Assignees: Head acoustics GmbH, Herzogenrath (DE); Werner Podszun, Nuertingen (DE)

( * ) Notice: Subject to any disclaimer, the term of this patent is extended or adjusted under 35 U.S.C. 154(b) by 0 days.

(21) Appl. No.: 09/410,348

(22) Filed: Sep. 30, 1999

(30) Foreign Application Priority Data

Sep. 30, 1998 (DE) .......................................... 198 44 784

(51) Int. Cl.$^7$ ................................................ A61F 11/06
(52) U.S. Cl. ........................................ 381/71.4; 381/86
(58) Field of Search .............................. 381/94.1–94.5, 381/94.7–94.9, 98, 86, 56, 58, 61, 71.4, 73.1

(56) References Cited

U.S. PATENT DOCUMENTS 5,426,703 A * 6/1995 Hamabe et al. ............... 381/71
5,748,748 A * 5/1998 Fischer et al. ............. 381/71.4
6,072,881 A * 1/2000 Linder ....................... 381/94.1

FOREIGN PATENT DOCUMENTS

DE          195 31 402          2/1997

* cited by examiner

Primary Examiner—Curtis Kuntz
Assistant Examiner—Lun-See Lao
(74) Attorney, Agent, or Firm—Crowell & Moring LLP

(57) ABSTRACT

A method determines and optionally eliminates a disturbing noise subjectively perceived by an operator, particularly a disturbing noise of a vehicle. The vehicle is operated by the operator complaining of the disturbing noise. Noise effects are recorded during the operation of the vehicle, particularly in the region of the operator's ear. From all sound effects, a noise sequence is taken which contains the disturbing noise. The noise sequence is played to the operator. If the noise sequence is at least similar to the disturbing noise, the noise sequence is converted to a sequential frequency spectrum using a mathematical algorithm. In the present sequential frequency spectrum, at least one frequency or group of frequencies is manipulated; from the manipulated frequency spectrum. A manipulation noise is generated and is played to the operator for evaluation the change of the disturbing noise. If the disturbing noise is reduced or removed in the manipulation noise, a corresponding repair is carried out.

27 Claims, 1 Drawing Sheet

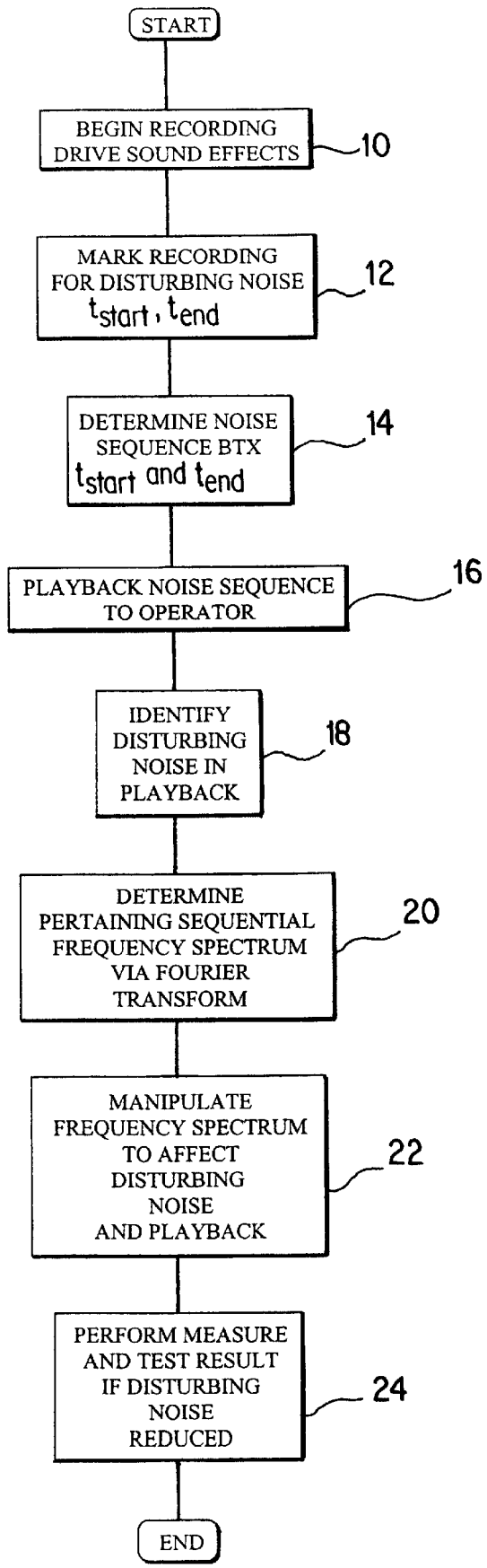

METHOD FOR DETERMINING AND OPTIONALLY ELIMINATING A DISTURBING NOISE SUBJECTIVELY PERCEIVED BY AN OPERATOR

BACKGROUND AND SUMMARY OF THE INVENTION

This application claims the priority of German Application No. 198 44 784.1, filed Sep. 30, 1998, the disclosure of which is expressly incorporated by reference herein.

The invention relates to a method for determining and optionally eliminating a disturbing noise subjectively perceived by an operator, particularly a disturbing vehicle noise, which is subjectively perceived by an operator of the vehicle, and particularly of a motor vehicle, used, for example, in the automobile industry and assumed to be known here.

From German Patent Document DE 195 31 402 A1, a method is known in which, for influencing the subjectively perceived driving impression as a function of a parameter (particularly as a function of the rotational engine speed and/or of the vehicle velocity), not only the airborne sound is influenced but also the structure-borne sound or vibrations perceived by the body. For this purpose, according to the size of the parameter, certain data are read out of a data field and, by means of vibration generators, are converted among others also into secondary vibrations which can be perceived by the body. Furthermore, the present sound effects are determined. The determined sound effects are compared with a comparative value filed (stored) in a data memory. If the determined comparative sound effects are above the comparative value at least at certain frequencies, the sound effects are converted by a mathematical algorithm, preferably a Fourier transform, into a frequency spectrum. The frequency spectrum is compared with frequency spectrums which have known error causes and are stored in a data and/or noise memory, and information is emitted concerning a required repair. If the frequency sequence, which is the result of the disturbing noise, and its cause are known, a corresponding repair can simultaneously be indicated and be carried out in a repair shop.

If, in the case of a vehicle, there is a complaint concerning a disturbing noise in the sound effects, it is difficult in some cases to find the pertaining cause. In particular, these difficulties are caused by the fact that the human language knows no mathematically clear terms for certain noises. Furthermore, the absolute acoustic memory, even in the case of acoustically trained individuals, is limited to no more than a few minutes.

In addition to disturbing noises in the above-mentioned vehicles, disturbing noises, whose cause should be eliminated, also occur on other equipment, such as processing machines, household appliances, etc.

It is an object of the invention to provide a method which improves upon the finding and eliminating of causes from which subjectively perceived disturbing noises result.

This object is achieved according to the present invention by a method for determining, and optionally eliminating, a subjectively perceived disturbing noise, particularly a disturbing noise which is perceived by an operator of a vehicle, in particular a motor vehicle. The invention is characterized by the jointly carried out process steps wherein: (a) the disturbing noise is recorded in the presence of the operator who has made the complaint; (b) the sound effects are recorded particularly in the region of the operator's ear; (c) a noise sequence, which contains the disturbing noise, is taken from the overall sound effects; (d) the noise sequence is played to the operator; (e) if the noise sequence is at least similar to the disturbing noise, the noise sequence is converted to a sequential frequency spectrum by means of a mathematical algorithm; (f) in the present sequential frequency spectrum, at least one frequency or group of frequencies, in the following simplified as "frequency sequence", is manipulated; (g) from the manipulated frequency spectrum, a manipulation noise is generated and is played to the operator for evaluating the change of the disturbing noise; and (h) if the disturbing noise is reduced or remote in the manipulation noise, a corresponding measure, particularly a repair, is carried out.

By means of the method or device according to the invention, it is possible to make the subjectively perceived disturbing noise at least partially objective and to optionally store it, in particular, on an electronic data carrier. By means of corresponding apparatuses, this impression can then be felt again or heard in a reproducible manner at any time. For localizing the cause of a disturbing noise, at least a single frequency is manipulated. The manipulation takes place particularly by means of at least one low pass, high pass and band pass filter, or an element or algorithm acting in this manner.

In addition, as the result of the claimed measures, the so-called acoustic memory, that is, the precise memory of the impression during the actual operation of the vehicle, is replaced by a reproducible recording and can therefore be prolonged by any extent.

Furthermore, as the result of the claimed method, repair costs are also reduced, which, in particular, is the result of saving time when finding the causes of the disturbing noises. In addition, the servicing is improved—among other things, by the saving of time—and customer satisfaction is increased.

In the automotive field, in a further development of the invention, the disturbing noises can also be classified according to the vehicle model, the motorization, the equipment, the operating conditions at which the disturbing noises occur, etc., and may be retrievable.

Other objects, advantages and novel features of the present invention will become apparent from the following detailed description of the invention when considered in conjunction with the accompanying drawings.

BRIEF DESCRIPTION OF THE DRAWINGS

The FIGURE is a flow chart of the process steps according to an embodiment of the invention.

DETAILED DESCRIPTION OF THE PREFERRED EMBODIMENT

EXAMPLE 1

An operator (driver) of a vehicle, particularly of a passenger car, notices a sound, which he subjectively considers as being disturbing, and complains about it to a repair shop. This disturbing noise may be lasting or may occur only during a certain operating condition, for example, when accelerating and/or during (possibly, engine) braking and/or at a certain speed, etc. According to the invention, as shown in the FIGURE, the mechanic will now take a device (which will be explained later) along with him into the vehicle and will drive in the vehicle together with the operator. During the operation of the vehicle, the mechanic records the sound effects during the drive, preferably in the region of the operator's ear (preferably both ears) (step 10). The recording preferably takes place in the operating condition of the vehicle in which the disturbing noise occurs. If the disturbing noise occurs and is only a sporadically occurring disturbing noise, the operator of the vehicle marks the start ($t_{start}$) and possibly the end ($t_{end}$) of the disturbing noise (step 12). This can take place, for example, by operating a switch and/or by a simple verbal statement.

A noise sequence (step 14) is now taken from the sound effects—the time signal. This noise sequence is arranged approximately between the marked times $t_{start}$ and $t_{end}$. (For reasons of completeness, it should be mentioned that the sound sequence and also the sound effects are an acoustic time signal (at least within ranges)). The noise sequence determined in this manner is played to the operator (step 16). For this purpose, it is repeated, in particular, in a continuous manner without interruptions—thus in the manner of a continuous loop. It is advantageous to use a headset for this purpose, which headset has a microphone as well as a loudspeaker. If the operator recognizes the disturbing noise (step 18) of which he complained in the acoustic presentation, the pertaining sequential frequency spectrum is determined from the time signal of the noise sequence containing the disturbing noise by means of a Fourier transform (step 20). The sequential frequency spectrum can be reconverted into an acoustic time signal (comparative noise) corresponding to the recorded noise sequence and can be replayed to the operator particularly for another check.

The sequential frequency spectrum is manipulated such that a certain frequency and/or a group of certain frequencies—in the following, simply called "frequency group"—is/are amplified or reduced (step 22). The manipulation expediently takes place by means of a high pass, low pass and/or a band pass filter. The corresponding filters are preferably implemented by corresponding software. The frequency spectrum manipulated in this manner is retransformed into a corresponding manipulation noise and is played again to the operator. The operator evaluates the manipulation noise as to whether the disturbing noise is lower or even completely removed. If this is the case, a corresponding measure is taken, particularly a repair is carried out, and the result is tested with respect to the noise in the manner described above (step 24). The testing can take place in a simple manner because the subjective disturbing noise, about which the complaint was expressed, was made objective according to the invention and was recorded as a data record.

EXAMPLE 2

The disturbing noise is recorded as in Example 1, which therefore does not have to be discussed here again. However, after the detection of the noise sequence, the sequential frequency spectrum of the noise sequence is compared here with corresponding sequential frequency spectrums of known disturbing noises. The known disturbing noises should preferably occur at the same operating parameters (vehicle model, motorization, acceleration, braking, speed, etc.). If there is at least a similarity between a known disturbing noise and the disturbing noise of the complaint, corresponding correction frequencies and/or correction frequency groups are taken out of the data bank and are correspondingly suggested to the mechanic.

From the sequential frequency spectrum, the manipulated frequency spectrum is generated by a change at the correction frequencies and/or correction frequency groups; the manipulated frequency spectrum is converted back into the acoustic manipulation noise; and the manipulation noise is played to the operator for another evaluation.

If the operator is of the opinion that the disturbing noise can no longer be heard in the manipulation noise, a corresponding measure or repair is carried out. The result which is obtained is then expediently recorded again, tested, and again presented to the operator for assessment.

EXAMPLE 3

The approach is that of Example 2. However, here, in addition to the known disturbing noise, the disturbing noise elimination approach (and ideally also the acoustic impression, which occurs after the corresponding repair), is stored in the data memory.

In this case, it is advantageous to be able to play the result of a measure or of a repair to the operator before the actual repair is carried out, whereby the operator can assess the sense of the intended repair measure. In particular, superfluous repair work is thereby avoided.

EXAMPLE 4

Example 4 relates to a continuation of Example 1. If the recording, the test and the repair for eliminating the disturbing noise were successful, the present sequential frequency spectrum, which was correlated with the disturbing noise, and possibly the present marginal conditions, like the vehicle model, the motorization, the operating conditions, etc. at which the disturbing noise occurs, the pertaining correction frequency and/or correction frequency groups, as well as the corresponding measures for eliminating the disturbing noise, are stored in the data memory.

EXAMPLE 5

In Example 5, the finding of the disturbing noise and the objectivating of the disturbing noise, as well as the whole approach for this purpose, are analogous to Example 1. However, in addition to the noise sequence, the whole recorded sound effects are converted to an overall frequency spectrum. This overall frequency spectrum is examined for pronounced frequencies, and particularly with respect to the correction frequencies and/or correction frequency groups on which known disturbing noises are based. If frequency spectrums of known disturbing noises occur in the overall frequency spectrum, this is automatically reported to the mechanic and optionally corresponding countermeasures are suggested.

In a further development of the invention, only the total recorded noise effects may also be converted to an overall frequency spectrum. This overall frequency spectrum is examined for pronounced frequency sequences which are based on known disturbing noises. The finding of the pronounced frequency sequences can preferably take place in that a comparable known overall frequency spectrum, about which no complaint was made, is subtracted from the present overall frequency spectrum and the remaining frequencies and/or frequency groups are assigned to defined disturbing noises or their cause.

In all examples, the data memories may be a mobile data memory, for example, a portable computer or a stationary data memory, which can be queried in a known manner, for example, by way of a modem.

The invention is advantageous for users, among others, who have relatively little experience with measuring techniques. These persons may be customer advisers of repair shops. Furthermore, use of the invention is also contemplated during final inspection of the product.

For implementing the above-described method, a corresponding system has a recorder, an analysis part and a data bank.

The recorder expediently has a very simple construction. It can be used, on the one hand, to record the overall sound effects and to monitor the time signals of the noises transformed back from the respective frequency spectrums, such as the noise sequence, the comparative noise and/or the manipulation noise. The recorder expediently has a level indicator and a progress indicator for playback. The calibration is preferably fixedly set to approximately 104 dB. In addition, switches or, on the software-side, switching signals can be provided for "recording", "stop", "play-back" and "wind and rewind" modes of operation.

The recorded sound effects can be supplied to an analysis part, without any file name being allocated by the user. It is therefore possible that the recording is stored on the hard disk and the file name is allocated later.

The analysis part is connected with a video screen on which all time signals of the respective noises can be displayed. In a special manner, this permits the fixing of the respective audible and analyzable time window of the respective noise.

The analysis part carries out, among other things, a Fast Fourier analysis of the noise sequence, the adjustment of the FFT duration being preferably automatically preadjusted as a function of the sampling rate and of the selected time window. For analyzing low-frequency noises (<1,000 Hz), a temporary sampling takes place. The analysis can be stored, for example, in the form of images.

For establishing the manipulated frequency sequence, acoustic filters can be activated in the analysis window, which acoustic filters influence the manipulation noise and thus the acoustic impression. The respective filters can be adjusted with respect to their center and limit frequency and quality.

The data bank supplies to the analysis part, among others, a possible file name. Furthermore, the data bank supplies product information which can be retrieved by way of switching symbols provided for this purpose. In addition to the product data, other information can also be requested and transmitted, such as correction frequencies, disturbing noises, operating conditions, as, for example, the vehicle model, the BA-code, the gear, the operating temperature of the engine, the cooling water and the oil, the load, the rotational engine speed, the crankshaft angle, the velocity, the frequency range, the frequency characteristics, in the case of disturbing noises depending thereon, etc. Repair measures in the case of known disturbing noises can preferably also be received from the data bank in the form of words and optionally also images. The data bank is expediently constructed to be network-compatible and linkable to other data banks.

Although the invention was described above by means of the preferred use on a motor vehicle and, in this case, particularly on a passenger car, the invention is also suitable for determining causes of disturbing noises in the case of machines, household appliances, etc. The approach in these cases is similar to the method described above.

The process according to the invention can also be used for determining sufficient damping measures, for example, in the case of windows or of sound dampers in flowing media, as particularly in the exhaust system (chimney) of a heating system or in the exhaust of a motor vehicle.

For this purpose, the sound effects are expediently measured with the disturbing noise, thus also in operation, and in the inoperative state, in the following called background noise. The disturbing noise is determined from the sound effects and its dB level interval is measured in comparison to the background noise. From the difference between the noise level and the background noise, the required dimension can then be determined of a sound damper or of another sound-absorbing measure. Since, in this case, no unnecessary overdimensioning takes place of the measure to be taken, the process according to the invention additionally results in savings when eliminating the disturbing noise.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a disturbing noise subjectively perceived by an operator of a system, the method comprising the acts of:

recording sound effects of the system with the operator being present, said sound effects including the disturbing noise;

determining a noise sequence, including the disturbing noise, from the recorded sound effects;

playing the noise sequence back to the operator of the system;

if the noise sequence is determined to be at least similar to the disturbing noise, converting the noise sequence to a sequential frequency spectrum via a mathematical algorithm;

manipulating at least one frequency or group of frequencies in the converted sequential frequency spectrum to obtain a manipulated frequency spectrum;

generating and playing to the operator a manipulation noise from the manipulated frequency spectrum and evaluating a change in the disturbing noise; and carrying out a corresponding measure on the system if the change in the disturbing noise is a reduction or removal of the manipulation noise.

2. The method according to claim 1, wherein the system is a vehicle.

3. The method according to claim 1, wherein the act of recording the sound effects comprises the act of recording the sound effects in an ear region of the operator.

4. The method according to claim 2, wherein the vehicle is operated by the operator complaining about the disturbing noise in an event of a disturbance, and wherein the sound effects are recorded during the operation of the vehicle.

5. The method according to claim 1, further comprising the act of assigning the manipulated at least one frequency or group of frequencies to a defined corresponding measure to be carried out on the system.

6. The method according to claim 4, further comprising the act of assigning the manipulated at least one frequency or group of frequencies to a defined corresponding measure to be carried out on the vehicle.

7. The method according to claim 1, wherein if the noise sequence is at least similar to the disturbing noise, the method comprising the act of comparing the sequential frequency spectrum of the noise sequence with comparative frequency spectrums previously stored in at least one of a data and noise memory, said stored comparative frequency spectrums having known disturbing noise causes.

8. The method according to claim 4, wherein if the noise sequence is at least similar to the disturbing noise, the method comprising the act of comparing the sequential frequency spectrum of the noise sequence with comparative frequency spectrums previously stored in at least one of a data and noise memory, said stored comparative frequency spectrums having known disturbing noise causes.

9. The method according to claim 7, wherein when a comparative frequency spectrum exists which is similar to, or the same as, the noise sequence or the sequential frequency spectrum, the method comprises the acts of:

retrieving from the data or noise memory corresponding correction frequencies or correction frequency sequences; and using the retrieved corresponding correction frequencies or correction frequency sequences for establishing the manipulated frequency spectrum from the sequential frequency spectrum of the noise sequence.

10. The method according to claim 9, wherein the act of carrying out a corresponding measure comprises the act of retrieving said measure from the data memory based on the corresponding correction frequencies or correction frequency sequences.

11. The method according to claim 1, wherein the recorded sound effects are played to the operator, being recorded, in real-time.

12. The method according to claim 4, wherein the recorded sound effects are played to the operator, being recorded, in real-time.

13. The method according to claim 1, wherein when a disturbing noise occurs, the operator marks a starting point in time subjectively perceived by the operator and, optionally, an end point in time of the occurrence of the disturbing noise.

14. The method according to claim 4, wherein when a disturbing noise occurs, the operator marks a starting point in time subjectively perceived by the operator and, optionally, an end point in time of the occurrence of the disturbing noise.

15. The method according to claim 13, wherein the noise sequence is taken approximately between the starting and ending points in time.

16. The method according to claim 1, wherein the act of determining the noise sequence comprises the act of multiplying the noise sequence to obtain a continuous loop before playing said noise sequence.

17. The method according to claim 4, wherein a vehicle-independent data memory is used as a data memory.

18. The method according to claim 1, wherein for a frequency spectrum which has previously been unknown and for which a determined cause of the disturbing noise is found, the method stores the corresponding frequency spectrum in a data memory.

19. The method according to claim 4, wherein for a frequency spectrum which has previously been unknown and for which a determined cause of the disturbing noise is found, the method stores the corresponding frequency spectrum in a data memory.

20. The method according to claim 1, wherein for a frequency spectrum which has previously been unknown and for which a determined cause of the disturbing noise is found, the method stores the corresponding frequency spectrum and pertaining correction frequencies or correction frequency sequences in a data memory.

21. The method according to claim 4, wherein for a frequency spectrum which has previously been unknown and for which a determined cause of the disturbing noise is found, the method stores the corresponding frequency spectrum and pertaining correction frequencies or correction frequency sequences in a data memory.

22. The method according to claim 1, wherein for a frequency spectrum which has previously been unknown and for which a determined cause of the disturbing noise is found, the method comprises the act of storing the corresponding frequency spectrum and pertaining correction frequencies or correction frequency sequences in a data memory, and further storing corresponding remedial measures in the data memory.

23. The method according to claim 4, wherein for a frequency spectrum which has previously been unknown and for which a determined cause of the disturbing noise is found, the method comprises the act of storing the corresponding frequency spectrum and pertaining correction frequencies or correction frequency sequences in a data memory, and further storing corresponding remedial measures in the data memory.

24. The method according to claim 1, wherein an entire sound sequence is converted to an overall frequency spectrum via the mathematical algorithm, and further wherein the sequential frequency spectrum is taken from the overall frequency spectrum and the sequential frequency spectrum is converted to the noise sequence.

25. The method according to claim 4, wherein an entire sound sequence is converted to an overall frequency spectrum via the mathematical algorithm, and further wherein the sequential frequency spectrum is taken from the overall frequency spectrum and the sequential frequency spectrum is converted to the noise sequence.

26. The method according to claim 1, wherein the entire recorded sound effects are converted to an overall frequency spectrum via the mathematical algorithm, the sequential frequency spectrum containing the disturbing noise being taken from the overall frequency spectrum; and further wherein the sequential frequency spectrum is converted to the noise sequence and, in addition, frequencies and frequency spectrums of known disturbing noises are searched in the overall frequency spectrum.

27. The method according to claim 4, wherein the entire recorded sound effects are converted to an overall frequency spectrum via the mathematical algorithm, the sequential frequency spectrum containing the disturbing noise being taken from the overall frequency spectrum; and further wherein the sequential frequency spectrum is converted to the noise sequence and, in addition, frequencies and frequency spectrums of known disturbing noises are searched in the overall frequency spectrum.

* * * * *